March 12, 1963 N. H. MIDGLEY 3,080,589
METHOD OF FORMING A LAMINATED INSOLE OF VARYING THICKNESS
Filed Oct. 30, 1959 2 Sheets-Sheet 1

INVENTOR
Noel Hetherington Midgley by Wendenoth, Lind and Ponack
ATTORNEYS

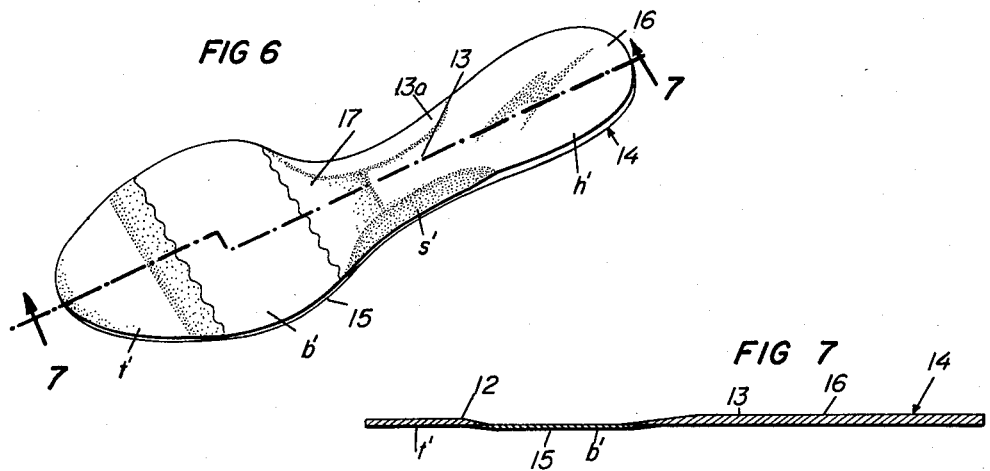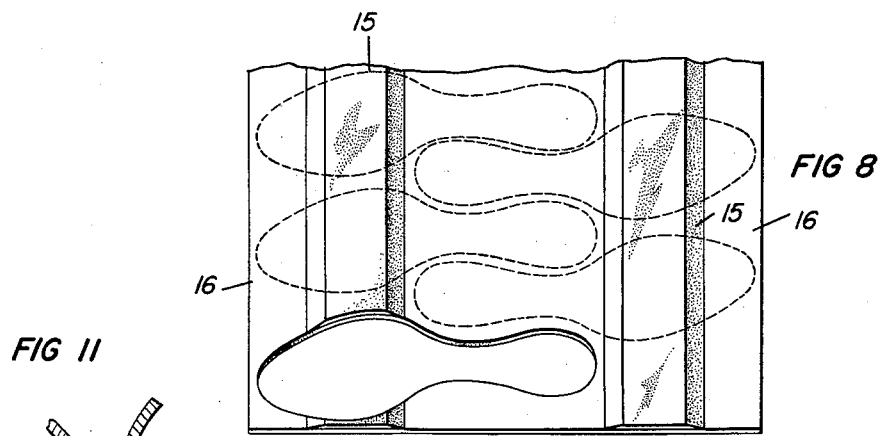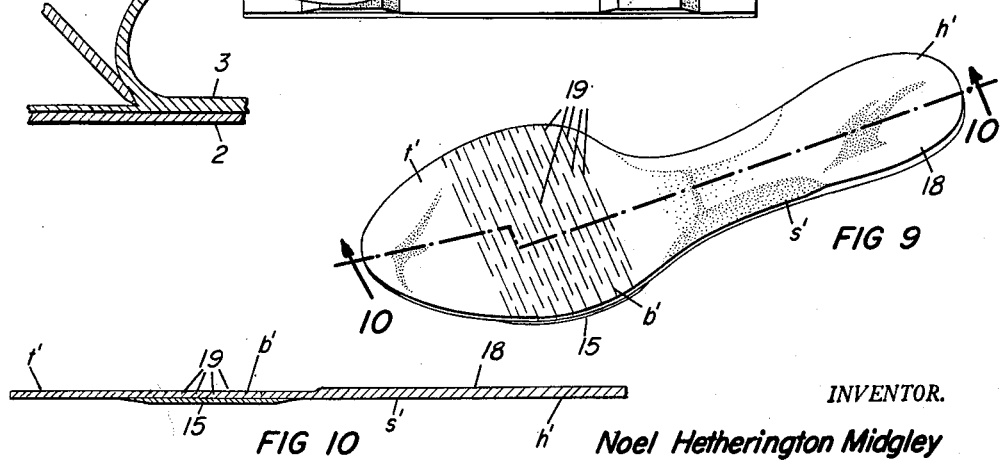

3,080,589
METHOD OF FORMING A LAMINATED INSOLE OF VARYING THICKNESS
Noel Hetherington Midgley, Caulfield, Victoria, Australia, assignor to Midgley Shoe Systems, Inc., Nashua, N.H., a corporation of New Hampshire
Filed Oct. 30, 1959, Ser. No. 849,959
Claims priority, application Australia June 10, 1955
11 Claims. (Cl. 12—146)

This invention relates to insoles and innersole foundations for shoes and like articles of footwear, the expression "insoles" as hereinafter employed in the description and the claims being intended to embrace "innersole foundations" which can be described as insole units prior to being molded to their final shape and prior to the application of reinforcement thereto.

This application is a continuation-in-part of my application Serial No. 589,293, filed June 4, 1956, now abandoned.

Conventional insoles have drawbacks, either in their structure or the manner in which they must be formed.

It is an object of the present invention to provide an insole and a method of forming an insole which overcomes these drawbacks, and to provide an extremely light insole which embodies the most desirable features of flexibility of forepart, thin but rigid toe area with a strong rear and central shank portion which tapers in nicely graduated contours from the full thickness to relatively fine edges at the sides and similarly to the fine flexible forepart.

Other and further objects of the invention will become apparent from the following specification and claims, taken together with the accompanying drawings, in which:

FIG. 6 is a perspective view of an insole, according to another embodiment of the invention, prior to molding into shape;

FIG. 7 is a section on line VII—VII of FIG. 6;

FIG. 8 is a perspective view of a portion of a laminated sheet showing how insoles as seen in FIG. 6 may be cut from the sheet with a minimum of waste;

FIG. 9 is a perspective view of an insole, according to another embodiment of the invention, prior to molding into shape;

FIG. 10 is a section along line X—X of FIG. 9; and

FIG. 11 is a schematic representation of the manner of removing the relatively rigid material.

Figure 1:
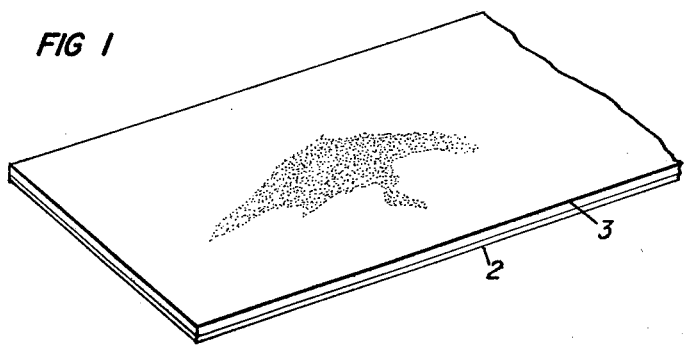
FIG. 1 is a perspective view of a portion of a laminated sheet from which the improved insoles may be formed.

Referring to FIG. 1, there is shown a two ply sheet from which insoles according to the invention may be cut, the sheet comprising a layer 2 of relatively thin flexible material, which may, for example, be canvas, duck, woven fiberglass, nylon or plastic material, or a leather split, synthetic leather-rubber composition or cork-rubber composition of about two irons thickness, and a layer 3 of relatively rigid material, preferably fiberboard, and of about four irons thickness. These two layers are adhered together face to face, as by use of a non-tacky pressure or heat sensitive adhesive.

Each of the embodiments of the insole according to the invention as shown in FIGS. 2–4 and 5–5a has a toe portion *t*, a ball portion *b*, a shank portion *s*, and a heel portion *h*, these portions extending respectively from the front to the rear of the insole. The layer 2 of flexible material has the same area as the area of the entire insole, while the layer of relatively rigid material is of varying thickness along the length of the insole, the portion 4 of the rigid material layer 3 in the toe portion *t* having a thickness less than the thickness of the layer of flexible material 2, the central longitudinal portion 6 of the rigid layer of the shank portion *s* and the portion 7 of the rigid layer in the entire area of the heel portion *h* having the maximum thickness. The rigid layer in the shank portion *s* is tapered from the central longitudinal portion toward the opposite side edges at 6a and toward the front of the shank portion at 5.

Figure 2:
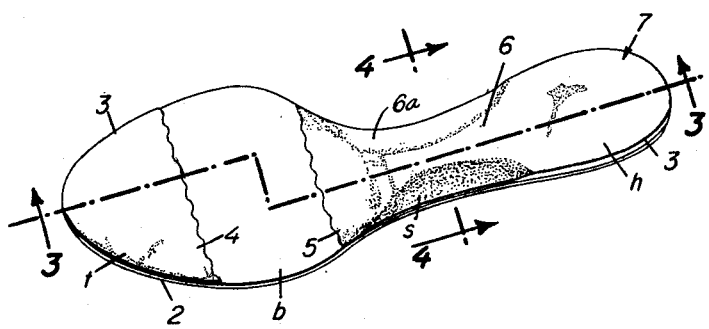
FIG. 2 is a perspective view of an insole formed from a laminated sheet as shown in FIG. 1, and showing the insole prior to molding into its final shape.
Figure 3:
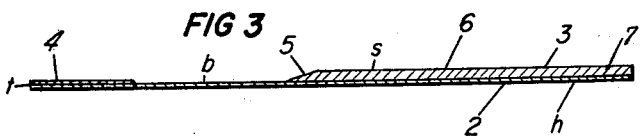
FIG. 3 is a longitudinal section taken on line III—III of FIG. 2.
Figure 4:
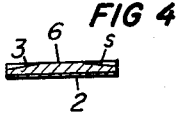
FIG. 4 is a section taken on line IV—IV of FIG. 2.

In the embodiment of FIGS. 2–4, the ball portion *b* of the insole consists of the layer 2 of the flexible material.

The method of forming the insole according to the embodiment of FIGS. 2–4 is to cut an insole blank from a sheet as shown in FIG. 1, and then to remove a part of the thickness of the layer of relatively rigid material from the toe portion *t* to leave a portion 4 having a thickness less than the thickness of the layer 2 of flexible material. Next all of the thickness of the layer of relatively rigid material is removed from the ball portion *b*. Thereafter the thickness of the layer of relatively rigid material in the shank portion *s* is tapered from the longitudinal center portion to the side edges thereof to leave the tapered portions 6a of the shank portion and is tapered toward the ball portion *b* to leave the tapered portion 5. The removal of the relatively rigid material may be carried out by any conventional method of reducing the thickness of leather, but it is preferred to perform the removal by skiving, in the manner shown schematically in FIG. 11.

This removal may be carried out by a skiving machine operating on master shapes in which case an edge about ¼" in width and of uniform thickness is left around the ball and shank portions. The master shape is then cut and rounded by cutting this edge so as to produce the desired shape as required. This is particularly important where large varieties of shapes and sizes are handled by factories making shoes in full ranges of multiple fittings. It is of course equally possible to perform the skiving operation on specific shapes which are already cut and rounded to size. In this instance no edge of uniform thickness is left during the skiving operation.

Due to the layers of the starting sheets being face to face, the sheets can be acted upon in both cutting and rounding operations three or more sheets at a time while the skiving operation is performed automatically.

Figure 5A:
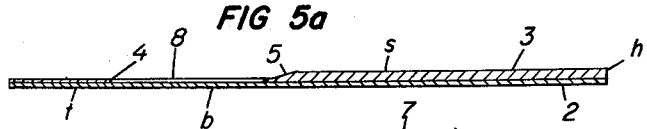
FIG. 5a is a section taken on line Va—Va of FIG. 5.
Figure 5:
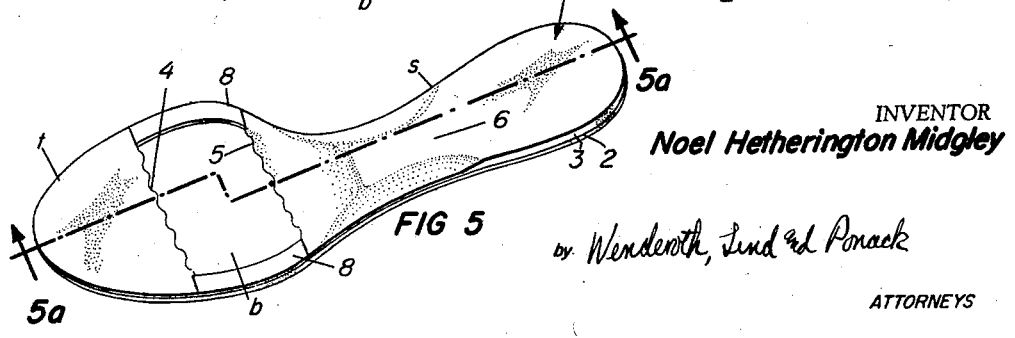
FIG. 5 is a perspective view of an insole according to another embodiment of the invention, prior to molding into its final shape.

In the embodiment of FIGS. 5–5a, the ball portion *b* comprises the layer 2 of flexible material and a strip 8 of relatively rigid material of the same thickness as the thickness of the portion 4 of the relatively rigid layer 3 in the toe portion *t* along each side edge of said ball portion *b*. While the insole is shown as having the shank portion *s* untapered toward the side edges thereof, it will be understood that this portion can be tapered as it is in the embodiment of FIGS. 2–4.

The method of forming the insole according to the embodiment of FIGS. 5–5a is the same as the method of forming the insole according to the embodiment of FIGS. 2–4, except that only a portion of the thickness of the layer of relatively rigid material is removed from the edges of the ball portion *b* rather than all of the thickness, leaving an untapered strip along each side edge of the ball portion *b*, these strips then being beveled inwardly. Of course, depending on the manner in which the relatively rigid material is removed from the ball portion *b*, the beveling can be carried out simultaneously with the removal operation.

Referring to FIG. 8, there is shown a two ply sheet from which certain embodiments of insoles according to the invention may be cut, the sheet comprising a layer 16 of relatively rigid material, preferably fiberboard, which in this instance may be of six irons thickness, there being two strips 15 of flexible material adhered face to face with the layer of rigid material, the same types of adhesive being used as specified for the sheet of material of FIG. 1. The insole blanks are then cut or stamped therefrom, the first blank facing in one direction with the ball portion overlying one of the strips 15, and the next blank facing in the opposite direction with the ball portion overlying the other of the strips 15. In this way, the waste material is kept to a minimum.

Each of the embodiments of the insole according to the invention as shown in FIGS. 6–7 and 9–10 has a toe portion $t'$, a ball portion $b'$, a shank portion $s'$, and a heel portion $h'$, these portions extending respectively from the front to the rear of the insole. The layer 15 of flexible material has an area which is the same as the area of the ball portion $b'$ of the insole, while the layer of relatively rigid material is of varying thickness along the length of the insole, the portion 12 of the rigid layer in the toe portion $t'$ having a thickness greater than the thickness of the flexible layer 15 but less than the maximum thickness of the relatively rigid material, the central longitudinal portion 13 of the rigid layer of the shank portion $s'$ and the portion 14 of the rigid layer in the entire area of the heel portion $h'$ having the maximum thickness. The portion 13 of the rigid layer in the shank portion $s'$ is tapered from the central longitudinal portion toward the opposite side edges at 13a and toward the front of the shank portion at 17.

In the embodiment of FIGS. 6–7, the ball portion $b'$ of the insole consists of the layer 15 of the flexible material.

The method of forming the insole according to the embodiment of FIGS. 6–7 is to take an insole blank cut or stamped from the sheet as shown in FIG. 8 and remove a part of the thickness of the relatively rigid material from the toe portion $t'$ to leave a portion 12 having a thickness greater than the thickness of the flexible material 15 but less than the maximum thickness of the relatively rigid material. Next all of the thickness of the relatively rigid material is removed from the ball portion $b'$. Thereafter the thickness of the relatively rigid material in the shank portion $s'$ is tapered from the longitudinal center portion to the side edges thereof to leave the tapered portions 13a of the shank portion, and is tapered toward the ball portion $b'$ to leave the tapered portion 17. The removal of the relatively rigid material can be carried out as described above with reference to FIGS. 2–4.

In the embodiment of FIGS. 9–10 the ball portion $b'$ of the insole comprises the layer 15 of the flexible material and a layer 18 of relatively rigid material of a thickness no greater than the thickness of the portion 12 of the relatively rigid layer in the toe portion $t'$. The layer 18 of relatively rigid material in the ball portion $b'$ is integral with the relatively rigid material of both the toe portion and the relatively rigid material of the shank portion $s'$. Extending across the width of the layer 18 in the ball portion $b'$ are a plurality of cuts 19. As shown, these cuts are in transverse lines of short cuts, there being a plurality of such short cuts along each transverse line, the lines being spaced from the front to the rear of the ball portion. These cuts, which are made without removing any material from the relatively rigid layer 18, increase the flexibility of the relatively rigid material, thus making the insole flexible at the ball portion, while the uncut layer of rigid material in the other portions of the insole keep the insole rigid in these portions.

The method of forming the insole according to the embodiment of FIGS. 9–10 is substantially the same as for the embodiment of FIGS. 6–7, except that the thickness of the layer of relatively rigid material removed from the ball portion $b'$ is the same as that removed from the toe portion $t'$, the thickness of the layer of relatively rigid material which is left in each of these portions being the same in this embodiment. After the removal of the relatively rigid material from the shank portion, a further step is performed, that of making a plurality of cuts in the layer 18 of relatively rigid material left on the ball portion $b'$. This may be carried out in any conventional manner. It is preferred that the cuts not extend all the way through the thickness of the layer 18 of the relatively rigid material, although it is not essential that this be the case.

As can be seen in all embodiments the shank portion of the insole which extends between the ball portion and heel portion should be of maximum thickness (e.g. six irons) along the central part thereof and be progressively reduced in thickness to a vanishing point at the front edge adjacent the ball portion and to about two irons at the opposite side edges as indicated in the figures.

The heel portion should maintain the original overall thickness of one or both layers, depending on the modification in question so that maximum strength for heeling assembly and stability of the central shank portion from the rear to a point approaching the ball portion will be ensured.

All changes in contour should be gradual or smoothly tapered in thickness to permit the insole to be applied with either side facing the bottom of the shoe last with equal facility. The desirability of the insole to be applied with one side, in preference to the other, facing the last bottom will usually be governed by the individual taste of the shoe manufacturer and the manner or means by which the insole is to be attached.

In some types of construction where the ball portion of the insole is to be tack lasted and the flexible layer 2 in that area may not provide sufficient strength to hold the clinched tacks satisfactorily, the insole according to FIGS. 5–5a is used, each strip being about seven-sixteenths of an inch wide and about fifteen-thousandths of an inch thick.

The comparative thinness of the edge strips does not unduly detract from the flexibility of the ball portion of the insole and the shoe of which it forms a part.

It will be apparent from the foregoing that according to the invention a minimum quantity of the expensive flexible material is used and that a relatively inexpensive rigid material is employed to complement the flexible material where strength and stability are required.

In order to point out the advantages of the present method, it is helpful to understand prior art insoles. Conventional insoles may be conveniently grouped as to their main distinguishing features under five broad headings as follows:

(1) A complete assembly of insole and waist reinforcements which are made up by a series of separate operations and from components which have been acted upon separately in various ways to provide a desirable insole.

(2) A one piece insole which is made out of a single blank of suitable material which has been acted upon by an automatic machine and matrix as disclosed for instance in Australian patent specification No. 129,463.

(3) An insole which is cut from prefabricated shoe material comprising alternate transversely extending strips of light rigid material, e.g., relatively thin fiber board, for the toe area—flexible material, e.g. thin leather, for the forepart—heavy rigid material, e.g. relatively thick fiber board, for the waist and heel area. The strips are skived or tapered along their adjoining edges which portions are coated with adhesive and lapped to their corresponding portions on each other.

(4) An insole which is built into the shoe piece by piece as the shoe is being made.

(5) A straight thin blank of flexible material in a master shape to which is adhered master shape fiber tucks or reinforcing pieces. These are then rounded to specific shapes singly and are put through other separate operations of waist reduction and forepart flexing before assembly to the shoe.

The advantages arising from the invention over and above conventional insole construction may be summarized as follows:

(a) The elimination of the ball portion flexing operation.

(b) The elimination of the equipment and operation used in producing, skiving and attaching separate rigid shank reinforcements.

(c) The elimination of the necessity and cost of storing ranges of styles and sizes of prepared reinforcements.

(d) The amount of relatively expensive flexible material required has been practically halved.

(e) The overall weight and bulk has been reduced considerably by virtue of the unobstructed lamination of the two layers with a considerable increase of strength at the heel area.

(f) The elimination of the necessity of light vulcanized fiberboard reinforcement at the heel area which is common practice with this type of insole construction.

(g) Eliminates gaping and ridging at the edges of the insole from the inside arch around the heel seat to the outside shank as the original two blanks are positioned in a flat form as previously described and exact jig registration is simple. In all other methods of producing the blank as described the edges will be perfectly true to shape; being cut or rounded from master shapes or sheet. This feature is particularly important in the manufacture of open shank and open backed sandal-type shoes where the insole is bound with a strip of material and is visible to the eye.

(h) As an insole requires two opposite physical qualities, those of extreme flexibility and extreme rigidity it follows that these are achieved to a higher degree by two layers or plies respectively possessing those qualities, at a considerable saving in material cost owing to a very small percent by weight, area and value of the more expensive flexible material being used.

(i) Eliminates the stripping, lap skiving, cementing and assembly necessary to cover all sizes, and also eliminates the necessity of shank reduction as a separate operation. The invention also ensures a much more attractive and precise article with none of the inherent weaknesses of prior art insoles at the points where the lap joint is made.

(j) Being a laminated unit it has obvious advantages of strength, precision and cost over prior art insoles.

(k) It is less costly than prior art insoles which are rounded to shape singly, the shanks are reduced singly and the ball portions fixed to the shank. If the material is thin or flexible enough not to require flexing then the the toe area would need to be reinforced as a separate operation.

The starting or basic sheets of FIGURE 1 may be produced in various ways, such for example as:

(i) By laminating the two sheets of materials in sheet form from which master shapes or specific shapes may be cut.

(ii) By cutting blanks of master shapes or specific shapes in each of the two materials from sheets which separately have been coated with non-tack pressure or heat activated adhesive. The blanks cut of each material are then placed together under heat and/or pressure.

(iii) By cutting master shape blanks separately from each material and applying a suitable adhesive to them before marrying the blanks of the two different materials. Specific shapes are then cut and rounded.

(iv) By cutting specific shapes separately and acting upon them in the same manner described in paragraph (iii).

Due to the fact that master shapes can be cut or rounded to the desired shapes as required without affecting the basic shape and contour of the insole, equipment, storage space and stocks are greatly reduced, and producing and storing subassembles which have to be later attached to the main insole can be done away with.

It will be appreciated that the thickness of fiberboard cut off at the ball portion is considerable, but as it is of uniform thickness (about four irons), it may be used to form fiber board seat pieces, heel lifts, or may be repulped, when it is a property of wood and paper pulp fiberboards.

Materials for the purpose are available in many different forms and are usually sold in rolls or sheets in thicknesses of close tolerance. If the thickness of material varies by being overweight then the skiving machine levels it off to the thicknesses designed into the matrix for the operation of the skiving machine.

If the materials are underweight and therefore of somewhat reduced thickness, then the only portion affected is the central shank portion and the heel which will be of reduced thickness by the same amount. All other reductions at the tapered shank portion toe and ball portions will be unaffected.

The invention is applicable to insoles for practically any kind of shoe, including those made by the cement process, the Littleway process, the machine sewn process, the welted process, the stitch down process, and the welted forepart and lasted shank and back process.

It is suitable for any process of shoe making which embodies an innersole as a separate unit.

In some cases it provides the foundation only, upon which further additions are made such as for welted-type shoes. A preformed sewing rib may be attached by any of the well-known methods to the basic innersole foundation as described in this specification.

Similarly in cement process manufacture a suitable steel reinforcement may be attached at the shank area.

The modifications of FIGS. 6–7, and 9–10 can be adopted with advantage where the utmost economy is desired and where some slight sacrifice of the strength and quality features above described is permissible. In these embodiments it will be seen that the relatively flexible and expensive material is employed solely in the ball portion of the insole and that the toe portion, the shank portion and the heel are formed solely of the relatively rigid and inexpensive material.

The stamped out master shapes may be fed to a die rolling or automatic skiving machine having a suitably contoured matrix as above described. In practice the knife of such machine may remove some of the rigid material at the toe portion to approximately 3½ irons thick, then all or substantially all of the rigid material in the ball portion, and in the case of the embodiment of FIGS. 6–7, approximately .005 inch of the thickness of the flexible material, followed by a gradual reduction of forward end of the shank portion, leaving the central zone of the shank portion and the entire heel seat area untouched at full thickness.

The same matrix is suitable as that used for the innersole of FIGS. 2–4.

The adhesion of the flexible strips to the rigid material does not necessarily have to be across the full area of the flexible strip, but could be on the bevelled areas only.

In this embodiment slightly thinner flexible material can be used and the knife of the skiving machine makes gradual reductions as described previously but, of course, merely separates the two materials at the ball portion by cutting the rigid material in the zone of the bonded bevels.

An insole according to the embodiment of FIGS. 6–7, and 9–10 is more easily produced than a conventional prior art insole in which there are alternate strips of rigid and flexible material and possesses the added advantage of having the shank gradually reduced to desired formation during a single pass of the blank through the skiving machine. Another advantage is that margins of the rigid material may be left at the opposite sides of the ball portion to provide for adequate tack lasting as described with reference to FIGURES 5 and 5a. That could only be done with the previously known construction by employing a thicker flexible material with the resultant increase of cost and reduction of flexibility.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A method of forming a multi-ply insole comprising assembling a multi-ply sheet consisting of a relatively thin flexible layer and a thicker layer of relatively rigid material, cutting an insole blank therefrom, removing a part of the thickness of the layer of relatively rigid material from substantially the entire area of the toe portion of the insole, removing at least some of the thickness of the layer of said relatively rigid material from the ball portion of said insole, and tapering the thickness of the layer of relatively rigid material in the shank portion from the longitudinal center to the side edges thereof and toward the ball portion.

2. A method of forming a multi-ply insole comprising assembling a multi-ply sheet consisting of a relatively thin flexible layer and a thicker layer of relatively rigid material, cutting an insole blank therefrom, removing a part of the thickness of the layer of relatively rigid material from substantially the entire area of the toe portion of the insole, removing at least some of the thickness of the layer of said relatively rigid material from the ball portion of said insole to leave at most a thickness of the layer of said relatively rigid material less than the thickness of the layer of said relatively rigid material on the toe portion, and tapering the thickness of the layer of relatively rigid material in the shank portion from the longitudinal center to the side edges thereof and toward the ball portion.

3. A method of forming a multi-ply insole comprising assembling a multi-ply sheet consisting of a relatively thin flexible layer and a thicker layer of relatively rigid material, cutting an insole blank therefrom, removing a part of the thickness of the layer of relatively rigid material from substantially the entire area of the toe portion of the insole, removing all of the thickness of the layer of said relatively rigid material from the ball portion, and tapering the thickness of the layer of relatively rigid material in the shank portion from the longitudinal center to the side edges thereof and toward the ball portion.

4. A method of forming a multi-ply insole comprising assembling a multi-ply sheet consisting of a relatively thin flexible layer and a thicker layer of relatively rigid material, cutting an insole blank therefrom, removing a part of the thickness of the layer of relatively rigid material from substantially the entire area of the toe portion to leave a thickness less than the thickness of the layer of thin flexible material, removing all of the thickness of the layer of said relatively rigid material from the ball portion, and tapering the thickness of the layer of relatively rigid material in the shank portion from the longitudinal center to the side edges thereof and toward the ball portion.

5. A method of forming a multi-ply insole comprising assembling a multi-ply sheet consisting of a relatively thin flexible layer and a thicker layer of relatively rigid material, said relatively thin flexible layer being less extensive in area than said thicker layer, cutting an insole blank from said multi-ply sheet with the forepart of said insole blank at the area of said multi-ply sheet having the relatively thin flexible layer thereon, removing a part of the thickness of the layer of relatively rigid material from substantially the entire area of the toe portion, removing all of the thickness of the layer of said relatively rigid material from the ball portion, and tapering the thickness of the layer of relatively rigid material in the shank portion from the longitudinal center to the side edges thereof and toward the forepart.

6. A method of forming a multi-ply insole comprising assembling a multi-ply sheet consisting of a relatively thin flexible layer and a thicker layer of relatively rigid material, cutting an insole blank therefrom, removing a part of the thickness of the layer of relatively rigid material from substantially the entire area of the toe portion to leave a thickness less than the thickness of the layer of thin flexible material, removing a portion of the thickness of the layer of said relatively rigid material from the edge portions of the ball portion and removing all of the thickness of the layer of said relatively rigid material from the center part of the ball portion, and tapering the thickness of the layer of relatively rigid material in the shank portion from the longitudinal center to the side edges thereof and toward the ball portion.

7. A method of forming a multi-ply insole comprising assembling a multi-ply sheet consisting of a relatively thin flexible layer and a thicker layer of relatively rigid material, cutting an insole blank therefrom, removing a part of the thickness of the layer of relatively rigid material from substantially the entire area of the toe portion, removing a part of the thickness of the layer of relatively rigid material from the ball portion to leave a thickness no greater than the thickness of the layer of relatively rigid material on the toe portion, and tapering the thickness of the layer of relatively rigid material in the shank portion from the longitudinal center to the side edges thereof and toward the toe portion.

8. A method of forming a multi-ply insole comprising assembling a multi-ply sheet consisting of a relatively thin flexible layer and a thicker layer of relatively rigid material, cutting an insole blank therefrom, removing a part of the thickness of the layer of relatively rigid material from substantially the entire area of the toe portion, removing a part of the thickness of the layer of relatively rigid material from the ball portion to leave a thickness no greater than the thickness of the layer of relatively rigid material on the toe portion, and tapering the thickness of the layer of relatively rigid material in the shank portion from the longitudinal center to the side edges thereof and toward the toe portion and making a plurality of cuts in the layer of relatively rigid material of the ball portion in a direction transverse to the longitudinal dimension of said insole, said cuts extending in transverse lines, and there being a plurality of said transverse lines spaced from the front to the rear of the ball portion.

9. A method of forming a multi-ply insole comprising assembling a multi-ply sheet consisting of a relatively thin flexible layer and a thicker layer of relatively rigid material, cutting an insole blank therefrom, removing a part of the thickness of the layer of relatively rigid material in substantially the entire toe portion of the insole, and removing at least some of the thickness of the layer of said relatively rigid material from the ball portion of said insole.

10. A method of forming a multi-ply insole comprising assembling a multi-ply sheet consisting of a relatively thin flexible layer and a thicker layer of relatively rigid material, cutting an insole blank therefrom, removing a part of the thickness of the layer of relatively rigid material from substantially the entire area of the toe portion to leave a thickness less than the thickness of the layer of thin flexible material, removing a portion of the thickness of the layer of said relatively rigid material from the edge portion of the ball portion and removing all of the thickness of the layer of said relatively rigid material from the center part of the ball portion.

11. A method of forming a multi-ply insole comprising assembling a multi-ply sheet consisting of a relatively thin flexible layer and a thicker layer of relatively rigid material, cutting an insole blank therefrom, removing a part of the thickness of the layer of relatively rigid material from substantially the entire area of the toe portion to leave a thickness less than the thickness of the layer of thin flexible material, removing a portion of the thickness of the layer of said relatively rigid material from the edge portion of the ball portion and removing a greater thickness of the layer of said relatively rigid material from the center part of the ball portion.

References Cited in the file of this patent

UNITED STATES PATENTS

| | | |
|---|---|---|
| 199,842 | Mattocks | Jan. 29, 1878 |
| 429,480 | Robinson et al. | June 3, 1890 |
| 1,926,683 | Miller | Sept. 12, 1933 |
| 2,231,551 | Sewall | Feb. 11, 1941 |
| 2,231,552 | Sewall | Feb. 11, 1941 |
| 2,508,392 | Issaly | May 23, 1950 |